(12) United States Patent
Chung et al.

(10) Patent No.: US 10,510,477 B2
(45) Date of Patent: Dec. 17, 2019

(54) PLANAR TRANSFORMER WITH MULTILAYER CIRCUIT BOARD

(71) Applicant: FAIRCHILD KOREA SEMICONDUCTOR LTD., Bucheon (KR)

(72) Inventors: BongGeun Chung, Incheon (KR); GwanBon Koo, Bucheon (KR); TaeSung Kim, Incheon (KR); YoonJoo You, Jeonju (KR)

(73) Assignee: SEMICONDUCTOR COMPONENTS INDUSTRRIES, LLC, Phoenix, AZ (US)

( * ) Notice: Subject to any disclaimer, the term of this patent is extended or adjusted under 35 U.S.C. 154(b) by 138 days.

(21) Appl. No.: 15/374,239

(22) Filed: Dec. 9, 2016

(65) Prior Publication Data

US 2017/0200552 A1    Jul. 13, 2017

Related U.S. Application Data

(60) Provisional application No. 62/276,337, filed on Jan. 8, 2016.

(51) Int. Cl.
*H01F 27/28* (2006.01)
*H02M 7/217* (2006.01)

(52) U.S. Cl.
CPC ......... *H01F 27/2804* (2013.01); *H01F 27/28* (2013.01); *H01F 27/2885* (2013.01); *H02M 7/217* (2013.01); *H01F 2027/2809* (2013.01)

(58) Field of Classification Search
CPC ..................... H01F 27/00–27/36; H01F 5/00

USPC ............ 336/65, 83, 180–184, 200, 206–208, 336/220–223, 232
See application file for complete search history.

(56) References Cited

U.S. PATENT DOCUMENTS

| 5,572,179 | A  | * | 11/1996 | Ito ...................... H01F 17/0006 336/200 |
| 6,175,295 | B1 | * | 1/2001  | Honma ..................... H01F 5/02 336/192 |
| 6,831,544 | B2 | * | 12/2004 | Patel ................... H01F 27/2804 336/200 |
| 8,963,676 | B1 |   | 2/2015  | Hoang |
| 9,368,270 | B2 |   | 6/2016  | Boone |
| 9,401,243 | B2 |   | 7/2016  | Park |
| 9,406,427 | B2 |   | 8/2016  | Kamgaing |
| 9,433,043 | B1 |   | 8/2016  | Hanz |

(Continued)

FOREIGN PATENT DOCUMENTS

KR             101055143 B1  *  8/2011

*Primary Examiner* — Tuyen T Nguyen
(74) *Attorney, Agent, or Firm* — AMPACC Law Group, PLLC (57) ABSTRACT

A planar transformer includes a magnetic core and a multilayer printed circuit board. A primary winding of the planar transformer is formed by winding traces on several layers of the printed circuit board. A layer of the printed circuit board that has a winding trace of the primary winding has a winding trace of another winding of the planar transformer, such as a winding trace of an auxiliary winding or a winding trace of a shield winding. The planar transformer further includes a secondary winding. The secondary winding can be a solid wire or a winding trace on a layer of the printed circuit board.

20 Claims, 7 Drawing Sheets

(56) References Cited

U.S. PATENT DOCUMENTS

2014/0292471 A1* 10/2014 Ho ........................ H01F 27/385
336/84 C

* cited by examiner

PLANAR TRANSFORMER WITH MULTILAYER CIRCUIT BOARD

CROSS-REFERENCE TO RELATED APPLICATION

This application claims the benefit of U.S. Provisional Application No. 62/276,337, filed Jan. 8, 2016, which is incorporated herein by reference in its entirety.

BACKGROUND OF THE INVENTION

1. Field of the Invention

The present invention relates generally to electrical circuits and components, and more particularly but not exclusively to transformers.

2. Description of the Background Art

In a switched mode power supply (SMPS), the transformer is one of the biggest components in terms of physical size and thus limits the form factor of the power supply. Therefore, reducing the volume of the transformer allows the power supply to have higher power density.

In contrast to a conventional transformer, which has wires as windings, the windings of a planar transformer are traces on a printed circuit board (PCB). This gives the planar transformer a lower profile compared to a conventional transformer. Typically, the height of the planar transformer is proportional to the thickness of the PCB containing the windings. Reducing the number of layers of the PCB thus reduces the height of the planar transformer as well as its cost.

SUMMARY

In one embodiment, a planar transformer includes a magnetic core and a multilayer printed circuit board. A primary winding of the planar transformer is formed by winding traces on several layers of the printed circuit board. A layer of the printed circuit board that has a winding trace of the primary winding has a winding trace of another winding of the planar transformer, such as a winding trace of an auxiliary winding or a winding trace of a shield winding. The planar transformer further includes a secondary winding. The secondary winding may be a solid wire or a winding trace on a layer of the printed circuit board.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, structures, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
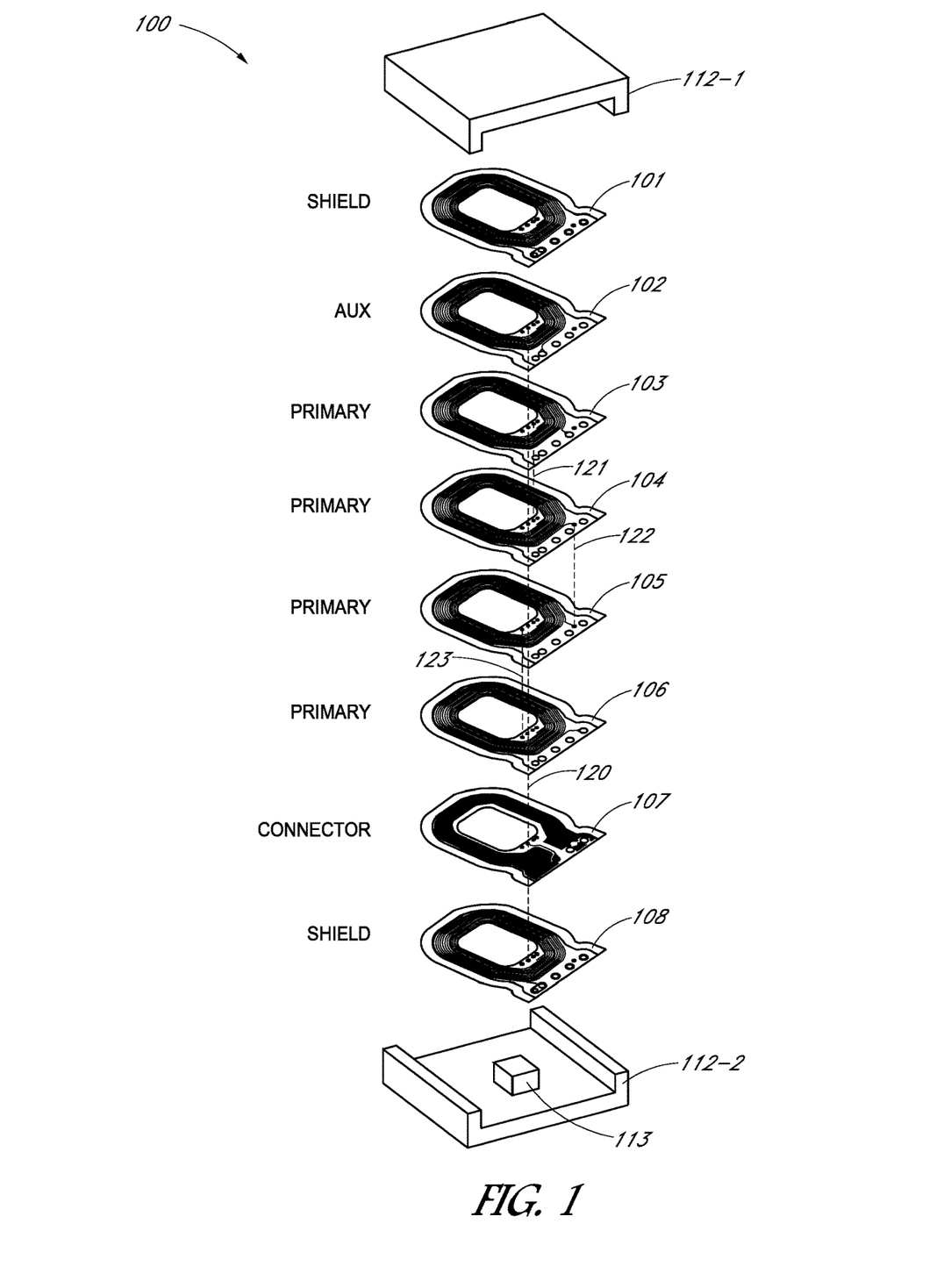
FIG. 1 shows an exploded view of a planar transformer.

FIG. 1 shows an exploded view of a planar transformer 100. The planar transformer 100 comprises a multilayer printed circuit board (PCB), which comprises PCB layers 101-108. The planar transformer 100 further comprises a magnetic core, which comprises an upper core 112-1 and a lower core 112-2. Each of the PCB layers 101-108 may have an opening through which a center leg of the magnetic core (see 113) may go through when the layers 101-108 are sandwiched between the upper core 112-1 and the lower core 112-2. The planar transformer 100 is a partial planar transformer in that each of its secondary windings (not shown) is a solid wire (instead of a trace on a PCB layer) that may be wound about the PCB.

Figure 2:
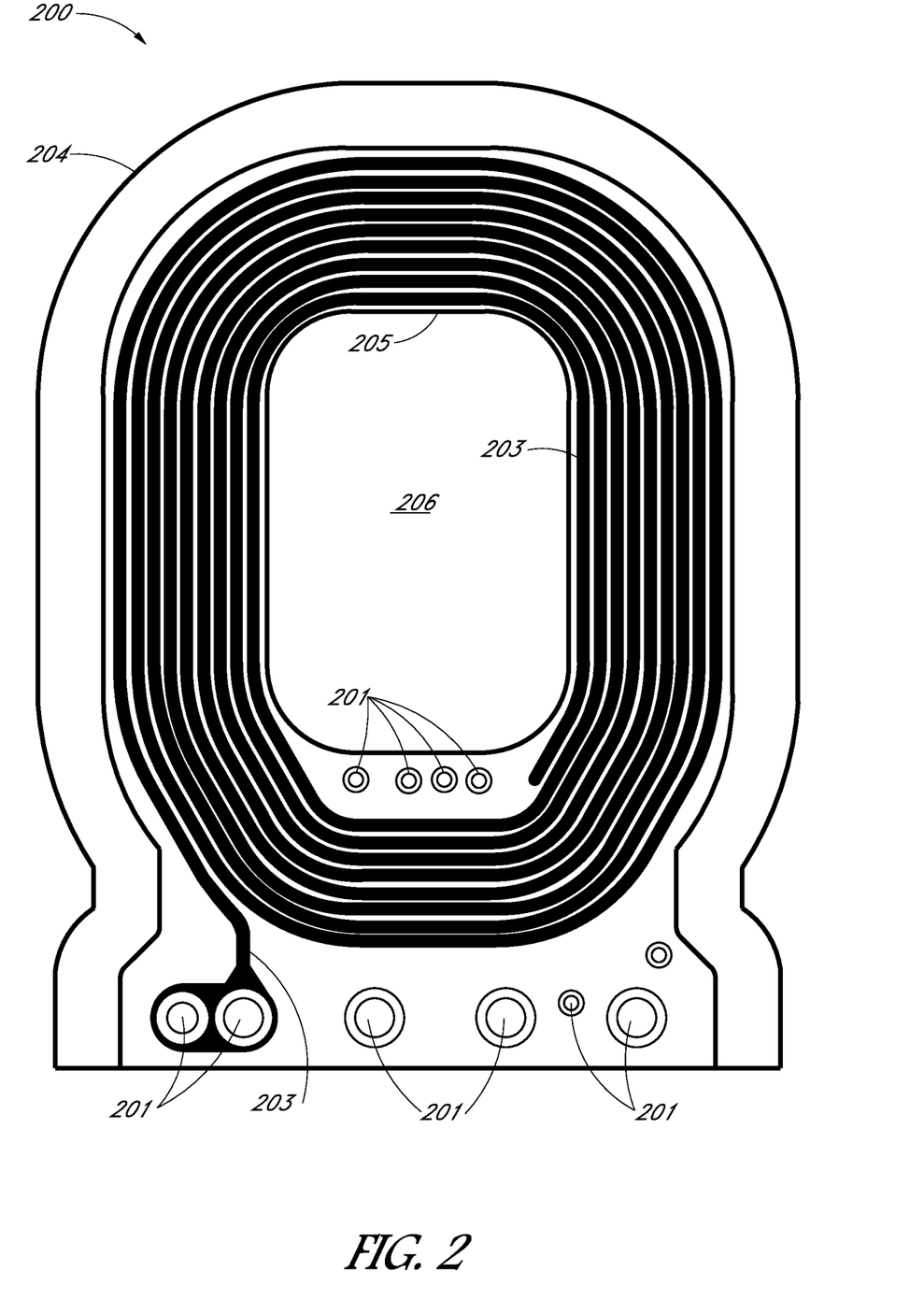
FIG. 2 shows an example layer of a PCB of a planar transformer.

FIG. 2 shows an example PCB layer 200 that may be used as a layer of a PCB of a planar transformer. The PCB layer 200 may be employed as any of the PCB layers 101-108 or any of the subsequently described PCB layers 401-408 (see FIG. 4). In the example of FIG. 2, the PCB layer 200 has a single winding trace 203. As will be more apparent below, one or more of the PCB layers 401-408 of FIG. 4 may have a plurality of winding traces.

Figure 4:
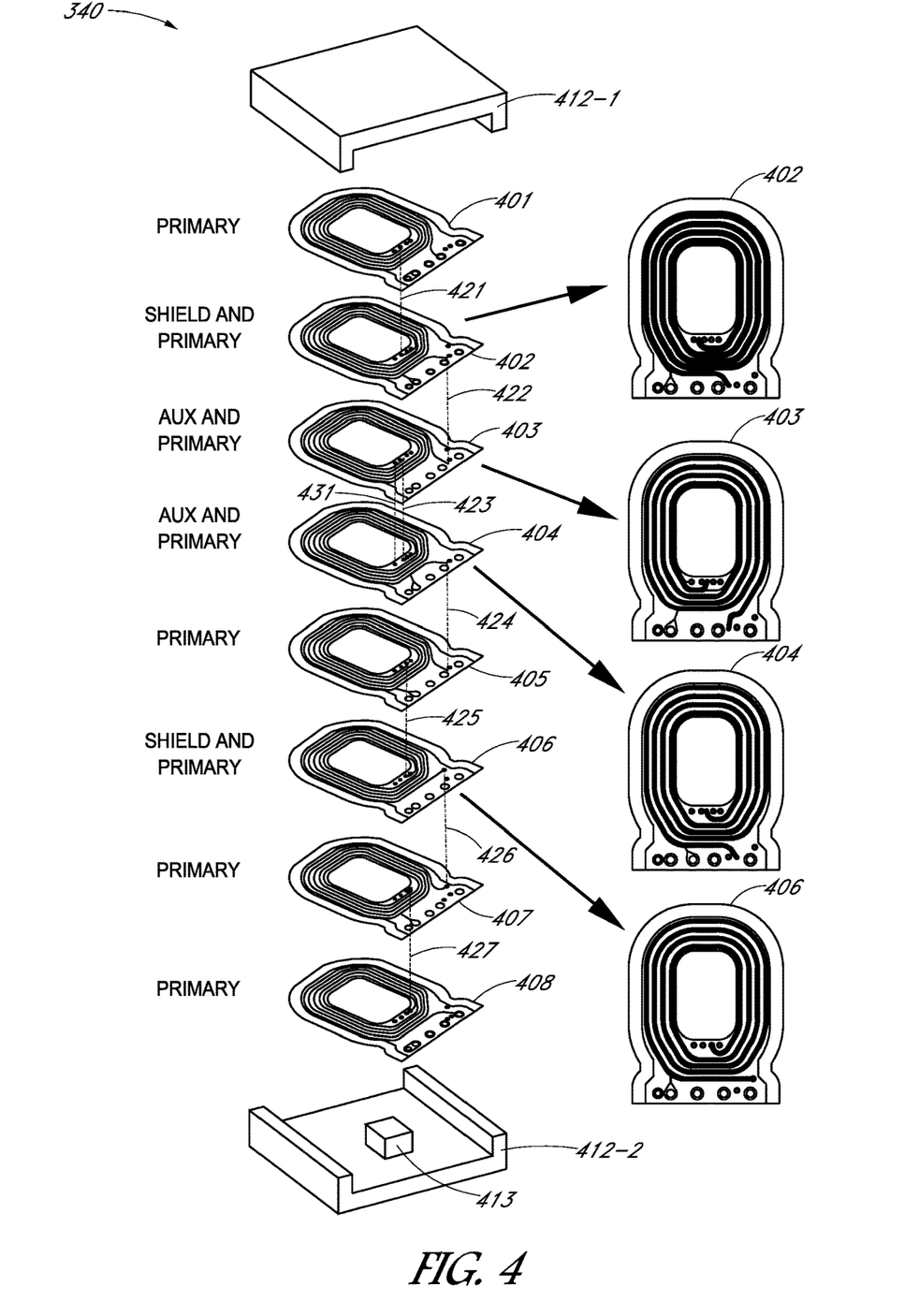
FIG. 4 shows an exploded view of a planar transformer in accordance with an embodiment of the present invention.

In the example of FIG. 2, the PCB layer 200 has an outer edge 204, an inner edge 205, and an opening 206 through which a magnetic core (e.g., FIG. 1, 113; FIG. 4, 413) may protrude. The PCB layer 200 includes a spiral winding trace 203 for a winding of the planar transformer. Generally speaking, a winding trace is a continuous, electrically conductive trace on a layer of a PCB. In the example of FIG. 2, the winding trace 203 has a pattern that turns around the inner edge 205. The number of times and the direction the winding trace 203 turns around the inner edge 205 are dictated by the winding formed by the winding trace 203.

A winding of a planar transformer may be distributed among several layers of the PCB. For example, the primary winding of the planar transformer 100 (see FIG. 1) may be distributed among the PCB layers 103-106, each of which has a primary winding trace. In the example of FIG. 2, the PCB layer 200 includes connection nodes 201 on which electrical connections may be made. For example, the winding trace 203 may be electrically connected to a connection node 201 of the PCB layer 200, and the connection node 201 of the PCB layer 200 may be electrically connected to a connection node of another PCB layer to electrically connect their winding traces in series to form a winding of the planar transformer. The connection nodes 201 of different layers of the PCB may be connected by way of vias through the layers. Generally speaking, an electrical connection may be made to a winding trace of a PCB layer by way of a connection node.

In the example of FIG. 1, the PCB of the planar transformer 100 has 8 layers, i.e., PCB layers 101-108, that are stacked in the order shown. The planar transformer 100 has a primary winding, an auxiliary winding, and shield windings. The primary winding of the planar transformer 100 is distributed among four layers of the PCB, namely the PCB layers 103-106. To form the primary winding, a winding trace of the PCB layer 103 is electrically connected to a winding trace of the PCB layer 104 (see 121), the winding trace of the PCB layer 104 is electrically connected to a winding trace of the PCB layer 105 (see 122), and the winding trace of the PCB layer 105 is electrically connected to a winding trace of the PCB layer 106 (see 123).

In the example of FIG. 1, the auxiliary winding of the planar transformer 100 is formed by a winding trace of the PCB layer 102, which is electrically connected to a PCB layer 107 (see 120) that serves as a connector to the auxiliary winding. The planar transformer 100 further includes a shield winding formed by a winding trace of the PCB layer 101 and another shield winding formed by a winding trace of the PCB layer 108. TABLE 1 below shows a summary of features of the planar transformer 100.

TABLE 1

| LAYER | DIRECTION | TURNS | WINDING |
| --- | --- | --- | --- |
| NONE | CCW | 4 | SECONDARY 1 |
| 101 | CW | 12 | SHIELD |
| 102 | CCW | 8 | AUX |
| 103 | CCW | 8 | PRIMARY |
| 104 | CCW | 8 | PRIMARY |
| 105 | CCW | 8 | PRIMARY |
| 106 | CCW | 8 | PRIMARY |
| 107 | CCW | 1 | CONNECTOR |
| 108 | CW | 12 | SHIELD |
| NONE | CCW | 4 | SECONDARY 2 |

TABLE 1 shows the winding trace turn direction (DIRECTION) and the number of turns ("TURNS") of the winding trace on each layer of the PCB of the planar transformer 100. The direction "CCW" indicates a counter-clockwise turn direction, while "CW" indicates a clockwise turn direction. The planar transformer 100 has two secondary windings, a single primary winding, and a single auxiliary winding. As explained, the secondary windings of the planar transformer 100 are not traces of the PCB; instead, each of the secondary windings is an actual solid wire.

From TABLE 1, it can be seen that primary winding of the planar transformer 100 has 32 turns (i.e., 8 turns×4 layers), the auxiliary winding of the planar transformer 100 has 8 turns, and each of the secondary windings of the planar transformer 100 has 4 turns. Generally speaking, to reduce the number of layers of the PCB for a given number of turns, the winding traces need to be wound as much as possible in every single layer. However, the DC and AC resistance of a winding will increase as its winding traces become too narrow, resulting in high conduction losses and low efficiency.

Figure 3:
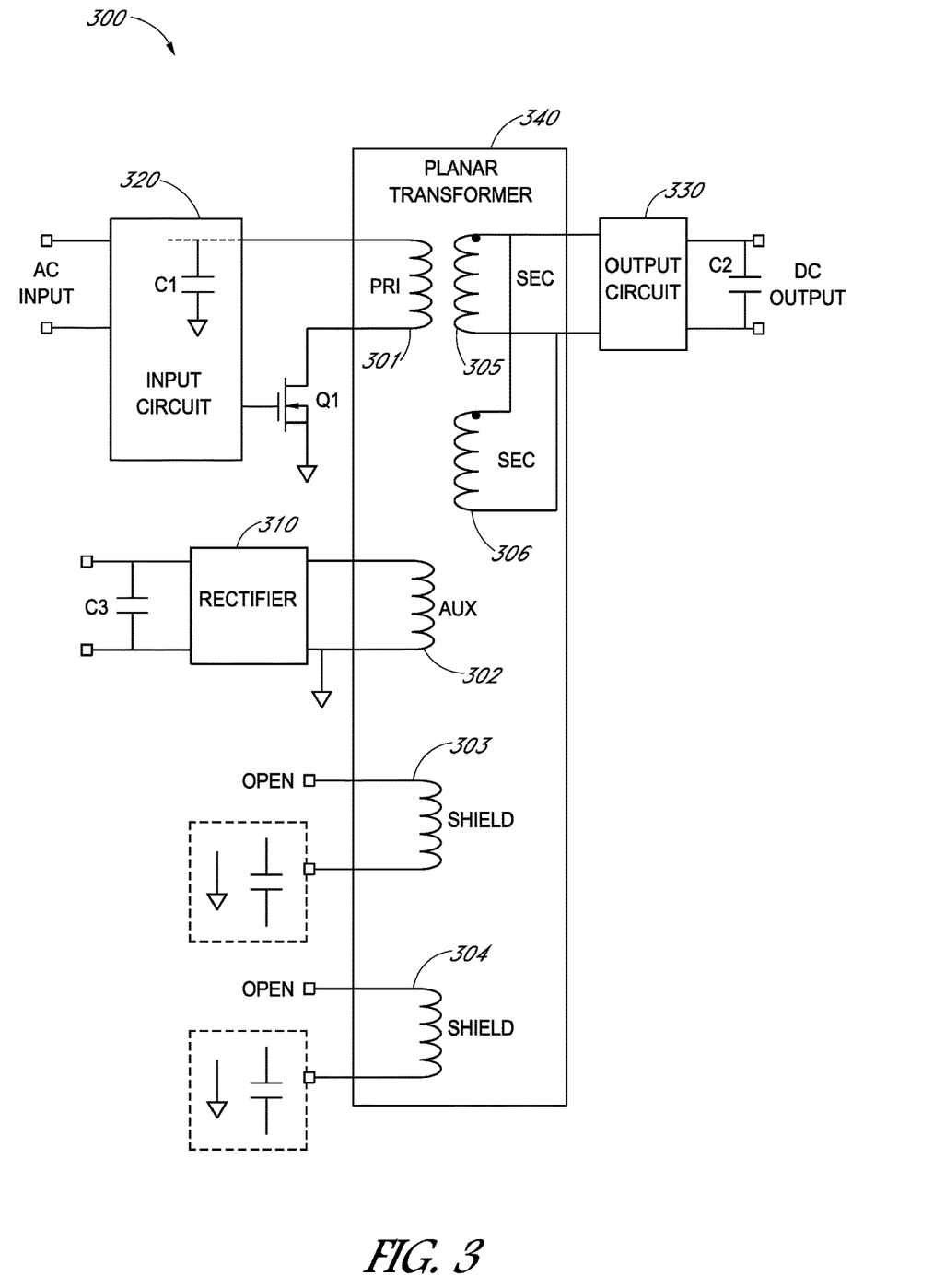
FIG. 3 shows a schematic diagram of an SMPS in accordance with an embodiment of the present invention.

FIG. 3 shows a schematic diagram of an SMPS 300 in accordance with an embodiment of the present invention. The SMPS 300 receives an AC source voltage to generate a regulated output DC voltage. In the example of FIG. 3, the SMPS 300 comprises an input circuit 320, a planar transformer 340, and an output circuit 330. In the example of FIG. 3, the planar transformer 340 comprises a primary winding 301, an auxiliary winding 302, a first shield winding 303, a second shield winding 304, a first secondary winding 305, and a second secondary winding 306. In the example of FIG. 3, the first secondary winding 305 and the second secondary winding 306 are connected in parallel to reduce DC and AC resistance on the secondary side and to increase coupling with the primary winding 301 by sandwich winding method.

In the example of FIG. 3, the input circuit 320 receives, filters, and rectifies the AC source voltage. One end of the primary winding 301 may be electrically connected to an energy storage element, such as a bulk capacitor C1 of the input circuit 320. The other end the primary winding 301 may be electrically connected to a switching device, such as the transistor Q1. One end of the auxiliary winding 302 may be electrically connected to an energy storage element (e.g., capacitor C3) and another end of the auxiliary winding 302 may be electrically connected to a power rail (e.g., ground reference). In the example of FIG. 3, the auxiliary winding 302 is electrically connected to the capacitor C3 by way of a rectifier 310 (e.g., a diode) to generate a supply voltage for the input circuit 320 or other circuit. A secondary winding 305/306 may be electrically connected to an output circuit 330 that charges an output capacitor C2. One end of a shield winding 303/304 may be electrically connected to an energy storage element (e.g., the bulk capacitor C1) or a power rail (e.g., ground reference), and the other end of the shield winding 303/304 may be left unconnected, i.e., open. The shield winding 303/304 provides noise cancellation.

The SMPS 300 may operate in accordance with conventional SMPS operation. As can be appreciated, the planar transformer 340 is not limited to an SMPS. The planar transformer 340 may be employed in other circuits that require a transformer.

FIG. 4 shows an exploded view of the planar transformer 340 in accordance with an embodiment of the present invention. In the example of FIG. 4, the planar transformer 340 comprises a PCB and a magnetic core. In one embodiment, the PCB is a multilayer PCB comprising the PCB layers 401-408, which are sandwiched between an upper core 412-1 and a lower core 412-2 of the magnetic core. The upper core 412-1 and the lower core 412-2 may comprise ferrite or other material suitable for use as a core of a transformer. Each of the PCB layers 401-408 may have an opening through which a portion of the magnetic core (see 413) may protrude when the PCB layers 401-408 are sandwiched between the upper core 412-1 and the lower core 412-2.

In the example of FIG. 4, the planar transformer 340 is a partial planar transformer in that each of its secondary windings 305/306 (see FIG. 3; not shown in FIG. 4) is an actual solid wire, instead of a trace on a layer of the PCB. The solid wire of the secondary windings 305/306 may be wound about the PCB. As can be appreciated, embodiments of the present invention are equally applicable to full planar transformers where all windings, including the secondary winding, are formed by traces on one or more layers of the PCB.

In the example of FIG. 4, the PCB of the planar transformer 340 has 8 layers i.e., PCB layers 401-408, that are stacked in the order shown. In one embodiment, the primary winding 301 of the planar transformer 340 is distributed among all of the 8 layers of the PCB. That is, the PCB layers 401-408 each has a winding trace, referred to as "a primary winding trace", for forming the primary winding 301. In the example of FIG. 4, to form the primary winding 301, a primary winding trace of the PCB layer 401 is electrically connected to a primary winding trace of the PCB layer 402 (see 421), the primary winding trace of the PCB layer 402 is electrically connected to a primary winding trace of the PCB layer 403 (see 422), the primary winding trace of the PCB layer 403 is electrically connected to a primary winding trace of the PCB layer 404 (see 423), the primary winding trace of the PCB layer 404 is electrically connected to a primary winding trace of the PCB layer 405 (see 424), the primary winding trace of the PCB layer 405 is electrically connected to a primary winding trace of the PCB layer 406 (see 425), the primary winding trace of the PCB layer 406 is electrically connected to a primary winding trace of the PCB layer 407 (see 426), and the primary winding trace of the PCB layer 407 is electrically connected to a primary winding trace of the PCB layer 408 (see 427). An energy storage element (e.g., FIG. 3, capacitor C1) may be electrically connected to the primary winding trace of the PCB layer 401 and a switching device (e.g., FIG. 3, transistor Q1) may be electrically connected to the primary winding trace of the PCB layer 408.

In the example of FIG. 4, the shield winding 303 is a winding trace on the PCB layer 402, and the shield winding 304 is a winding trace on the PCB layer 406. A winding trace for a shield winding is also referred to herein as a "shield winding trace." In the example of FIG. 4, the PCB layer 402 has a primary winding trace and a separate shield winding trace. That is, PCB layer 402 has two separate trace patterns, one for the primary winding 301 and another for the shield winding 303. Similarly, the PCB layer 406 has a primary winding trace for the primary winding 301, and a separate shield winding trace for the shield winding 304.

In the example of FIG. 4, the auxiliary winding 302 of the planar transformer 340 is distributed among two layers of the PCB, namely the PCB layers 403 and 404. More particularly, each of the PCB layers 403 and 404 has a winding trace for the auxiliary winding 302, which is also referred to herein as an "auxiliary winding trace." More particularly, the PCB layer 403 has a primary winding trace for the primary winding 301 and a separate auxiliary winding trace for the auxiliary winding 302. Similarly, the PCB layer 404 has a primary winding trace for the primary winding 301 and a separate auxiliary winding trace for the auxiliary winding 302. The auxiliary winding trace of the PCB layer 403 is electrically connected to the auxiliary winding trace of the PCB layer 404 (see 431) to form the auxiliary winding 302.

Figure 5:
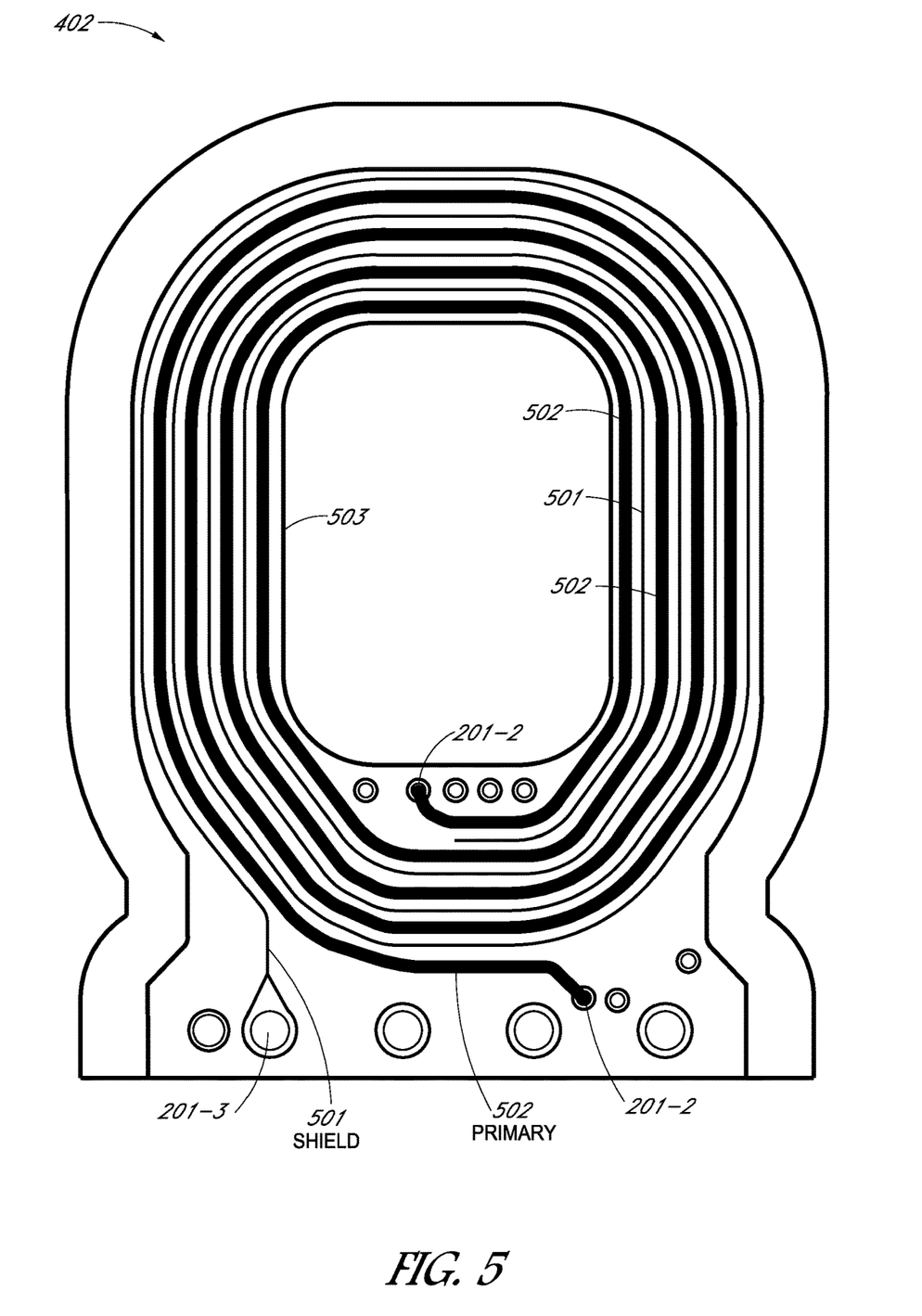
FIG. 5 shows a multi-winding layer of a multilayer PCB in accordance with an embodiment of the present invention.

FIG. 5 shows the PCB layer 402 in accordance with an embodiment of the present invention. The PCB layer 402 has a primary winding trace 502 for the primary winding 301 and a shield winding trace 501 for the shield winding 303. The PCB layer 406, which also has a primary winding trace for the primary winding 301 and a shield winding trace for the shield winding 304, may have a similar structure as the PCB layer 402. The PCB layers 402 and 406 are multi-winding layers in that each has more than one winding trace.

In the example of FIG. 5, the primary winding trace 502 spirals around an inner edge 503. An end of the primary winding trace 502 is electrically connected to a connection node 201-1 and the opposing end of the primary winding trace 502 is electrically connected to a connection node 201-2. In the example of FIG. 5, the shield winding trace 501 spirals between portions of the primary winding trace 502 around the inner edge 503. An end of the shield winding trace 501 is electrically connected to a connection node 201-3 and an opposing end of the shield winding trace 501 is left open, i.e., unconnected. The PCB layer 402 has more than one trace pattern, i.e., one for the primary winding 301 and another for the shield winding 303, to allow the primary winding 301 to be distributed among a larger number of layers with fewer turns per layer. This allows the primary winding 301 to have a wider winding trace in each layer, resulting in lower DC and AC resistance.

Figure 6:
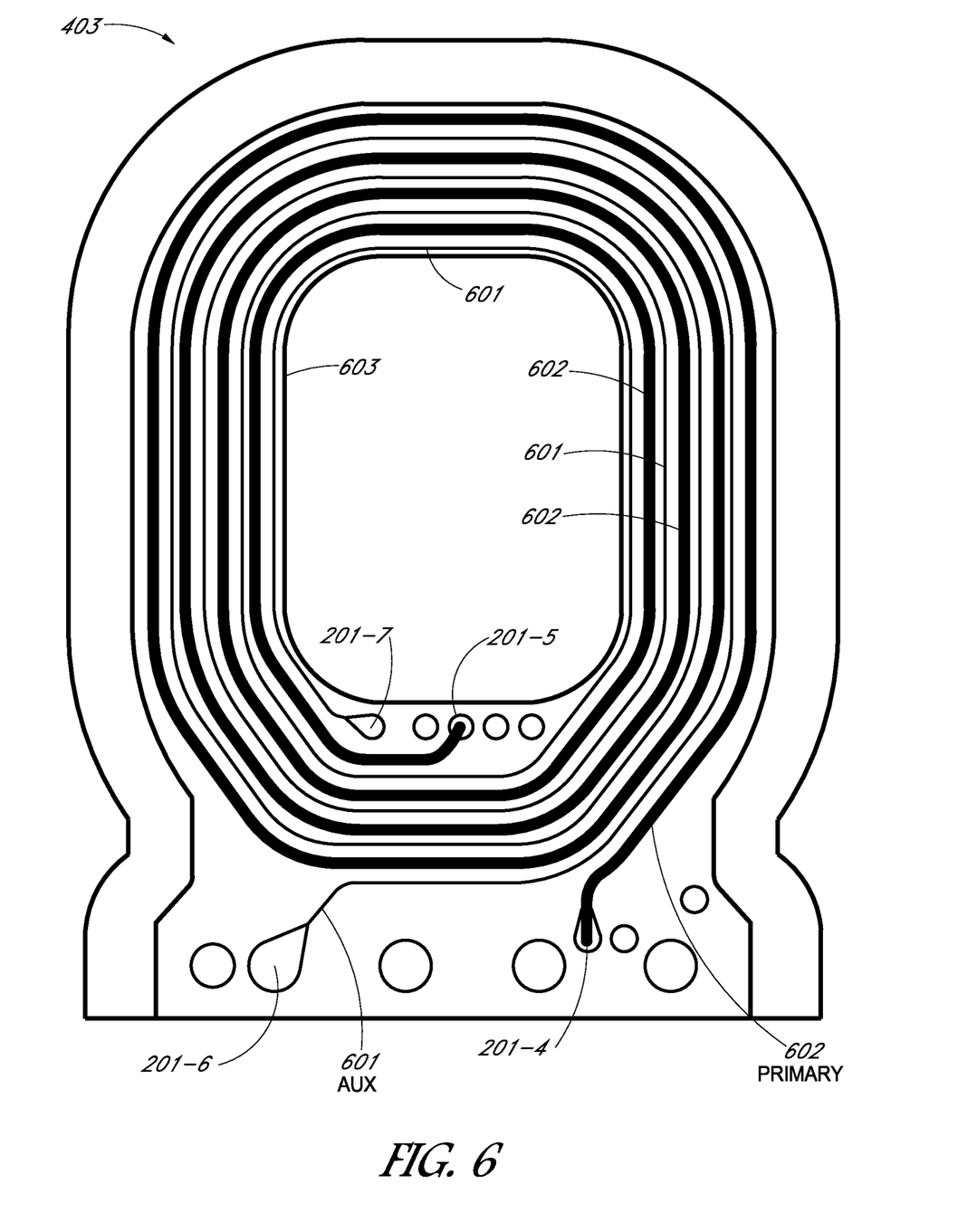
FIG. 6 shows a multi-winding layer of a multilayer PCB in accordance with an embodiment of the present invention.

FIG. 6 shows the PCB layer 403 in accordance with an embodiment of the present invention. The PCB layer 403 has a primary winding trace 602 for the primary winding 301 and an auxiliary winding trace 601 for the auxiliary winding 302. The PCB layer 404, which also has a primary winding trace for the primary winding 301 and a shield winding trace for the auxiliary winding 302, may have a structure similar to that of the PCB layer 403. The PCB layers 403 and 404 are multi-winding layers in that each has more than one winding trace.

In the example of FIG. 6, the primary winding trace 602 spirals around an inner edge 603. An end of the primary winding trace 602 is electrically connected to a connection node 201-4 and the opposing end of the primary winding trace 602 is electrically connected to a connection node 201-5. In the example of FIG. 6, the auxiliary winding trace 601 spirals between portions of the primary winding trace 602 around the inner edge 603. An end of the auxiliary winding trace 601 is electrically connected to a connection node 201-6 and an opposing end of the auxiliary winding trace 601 is electrically connected to a connection node 201-7. Similar to the PCB layers 402 and 406, the PCB layers 403 and 404 each has a plurality of trace patterns, i.e., one for the primary winding 301 and another for the auxiliary winding 302, to allow the primary winding 301 to be distributed among a larger number of layers with fewer turns per layer, thereby allowing the primary winding traces to be widened for reduced DC and AC resistance.

Referring back to FIG. 4, the PCB of the planar transformer 340 has 8 layers, with the PCB layer 401 directly on top of the PCB layer 402, the PCB layer 402 directly on top of the PCB layer 403, the PCB layer 403 directly on top of the PCB layer 404, the PCB layer 404 directly on top of the PCB layer 405, the PCB layer 405 directly on top of the PCB layer 406, the PCB layer 406 directly on top of the PCB layer 407, and the PCB layer 407 directly on top of the PCB layer 408. Vias allow for electrical connections between layers. As explained, the PCB layers 402 and 406 each has a shield winding trace and a primary winding trace, and the PCB layers 403 and 404 each has an auxiliary winding trace and a primary winding trace.

Figure 7:
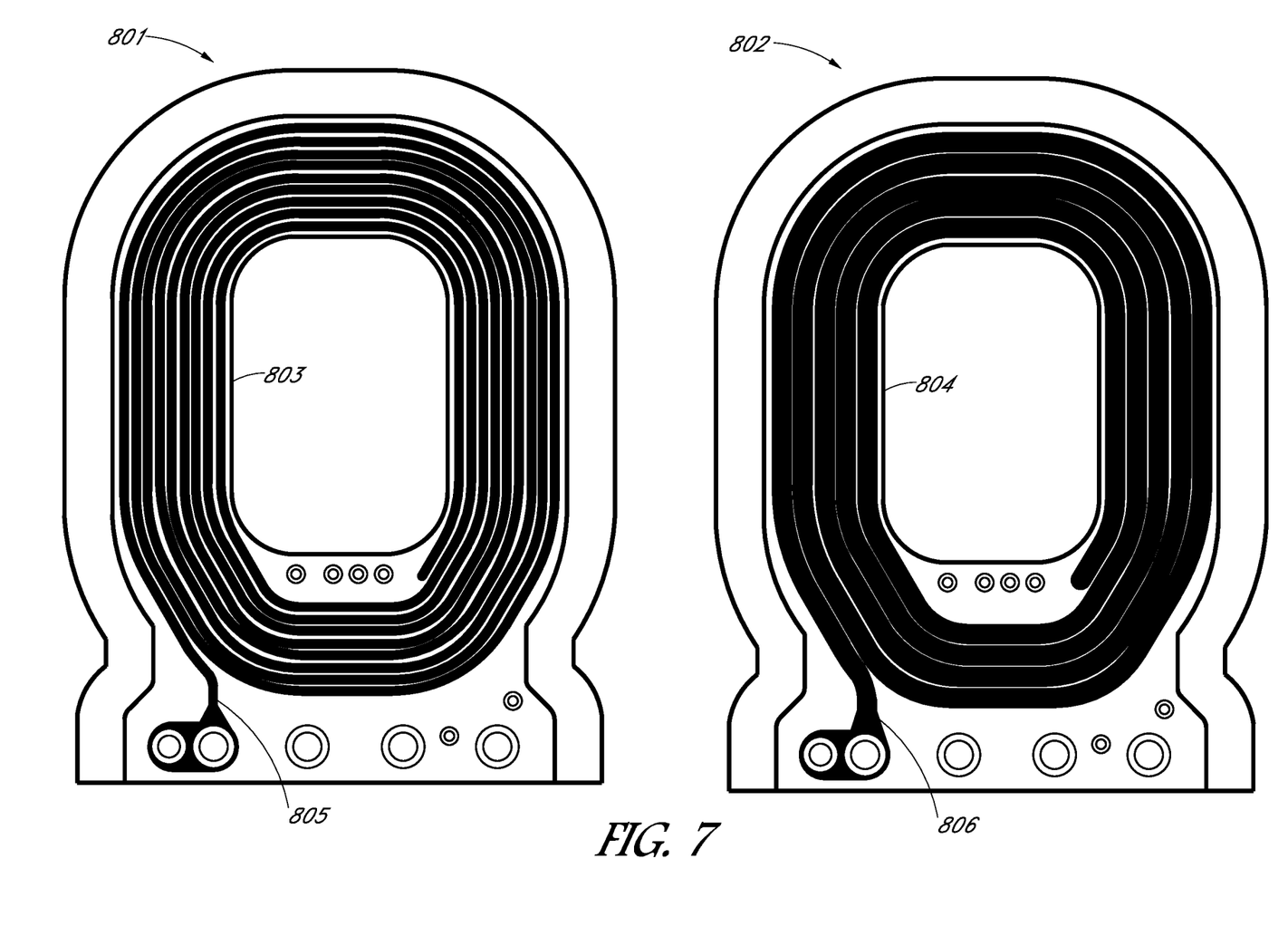
FIG. 7 shows a comparison of widths of winding traces with different numbers of turns.

In the example of FIG. 4, the PCB layers 401, 405, 407, and 408 each has a single winding trace, which is a primary winding trace. Because the primary winding 301 has been distributed among all 8 layers, the primary winding traces of the PCB layers 401, 405, 407, 408 can have less turns and accordingly can be made wider than usual. This is illustrated in FIG. 7, which compares the 9-turn winding trace 805 of a PCB layer 801 to a 5-turn winding trace 806 of a PCB layer 802. In the example of FIG. 7, the winding trace 805 has 9 turns around the inner edge 803, whereas the winding trace 806 has 5 turns around an inner edge 804. Because of its fewer turns, the winding trace 806 can be made wider than the winding trace 805. Embodiments of the present invention thus allow for lower DC and AC resistance with the same number of PCB layers.

TABLE 2 below shows a summary of features of the planar transformer 340 in accordance with an embodiment of the present invention.

TABLE 2

| LAYER | DIRECTION | TURNS | WINDING |
| --- | --- | --- | --- |
| NONE | CCW | 4 | SECONDARY |
| 401 | CCW | 5 | PRIMARY |
| 402 | CW | 4 | SHIELD |

TABLE 2-continued

| LAYER | DIRECTION | TURNS | WINDING |
|---|---|---|---|
|  | CCW | 4 | PRIMARY |
| 403 | CCW | 4 | PRIMARY |
|  | CCW | 4 | AUXILIARY |
| 404 | CCW | 4 | PRIMARY |
|  | CCW | 4 | AUXILIARY |
| 405 | CCW | 5 | PRIMARY |
| 406 | CCW | 4 | PRIMARY |
|  | CW | 4 | SHIELD |
| 407 | CCW | 5 | PRIMARY |
| 408 | CCW | 5 | PRIMARY |
| NONE | RW | 4 | SECONDARY |

TABLE 2 shows the winding trace turn direction (DIRECTION) and the number of turns ("TURNS") of the winding traces on layers of the planar transformer 340. The direction "CCW" indicates a counter-clockwise turn direction, while "CW" indicates a clockwise turn direction. The planar transformer 340 has two secondary windings, a single primary winding, and a single auxiliary winding. As explained, the secondary windings of the planar transformer 340 are not traces of the PCB; instead, each of the secondary windings is an actual solid wire.

As is evident from TABLE 2, the number of turns of the primary winding trace in each of the single winding layers, i.e., PCB layers 401, 405, 407, and 408 is 5, which is fewer than in the PCB layers of the planar transformer 100. Furthermore, the number of turns of winding traces in each of the multi-winding layers, i.e., PCB layers 402, 403, 404, and 406, is 4, which ensure the width of a winding trace due to relatively narrow auxiliary winding and shield winding traces. As a result, the total number of turns of the primary winding 301 is 36 (5 turns×4 layers+4 turns×4 layers), the total number of turns of the auxiliary winding 302 is 8, and the total number of turns of each of the secondary windings is 4. Although the PCB of the planar transformer 340 has the same number of layers as that of the planar transformer 100, the primary winding 301 of the planar transformer 340 has less DC and AC resistance because its winding traces can be made wider. Alternatively, by combining winding traces of at least two windings on a single layer, the PCB of the planar transformer 340 can have less layers (and is thus thinner) but with the same winding DC and AC resistance.

A planar transformer with a multilayer PCB has been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A planar transformer comprising:
   a magnetic core;
   a multilayer circuit board, a first layer of the circuit board comprising a first winding trace and a second winding trace, a second layer of the circuit board comprising a third winding trace, and a third layer of the circuit board comprising a fourth winding trace, wherein the first winding trace on the first layer and the third winding trace on the second layer are electrically connected to form a first winding of the planar transformer and the second winding trace on the first layer forms a second winding of the planar transformer; and
   a secondary winding, wherein the secondary winding comprises a wire that is not part of the multilayer circuit board.

2. The planar transformer of claim 1, wherein the first winding trace on the first layer and the third winding trace on the second layer form a primary winding of the planar transformer.

3. The planar transformer of claim 2, wherein the first winding trace on the first layer and the third winding trace on the second layer have different numbers of turns.

4. The planar transformer of claim 1, wherein the first winding trace on the first layer and the third winding trace on the second layer form a primary winding of the planar transformer and the second winding trace on the first layer forms an auxiliary winding of the planar transformer.

5. The planar transformer of claim 1, wherein the first and second winding traces have a same number of turns.

6. The planar transformer of claim 1, wherein the third layer further comprises a fifth winding trace that forms a shield winding of the planar transformer.

7. The planar transformer of claim 6, wherein the first winding trace on the first layer is electrically connected to the fourth winding trace on the third layer to form a primary winding of the planar transformer.

8. The planar transformer of claim 1, wherein the multilayer circuit board has an opening through the first, second, and third layers, and a portion of the magnetic core protrudes through the opening.

9. The planar transformer of claim 8, wherein the first winding trace, the second winding trace, the third winding trace, and the fourth winding trace are each wound around the opening.

10. The planar transformer of claim 1, wherein the magnetic core comprises an upper core and a lower core, wherein the multilayer circuit board is disposed between the upper core and the lower core.

11. The planar transformer of claim 1, wherein a winding trace of the first, second, third, and fourth winding traces has a width different from another winding trace of the first, second, third, and fourth traces.

12. A planar transformer comprising:
    a multilayer circuit board, a first layer of the circuit board comprising a first winding trace and a second winding trace, a second layer of the circuit board comprising a third winding trace, and a third layer of the circuit board comprising a fourth winding trace, wherein the first winding trace on the first layer and the third winding trace on the second layer are electrically connected to form a first winding of the planar transformer and the second winding trace on the first layer forms a second winding of the planar transformer; and
    a secondary winding, wherein the secondary winding comprises a wire that is not part of the multilayer circuit board.

13. The planar transformer of claim 12, wherein the first winding trace on the first layer and the third winding trace on the second layer form a primary winding of the planar transformer.

14. The planar transformer of claim 13, wherein the first winding trace on the first layer and the third winding trace on the second layer have different numbers of turns.

15. The planar transformer of claim 12, wherein the first winding trace on the first layer and the third winding trace on the second layer form a primary winding of the planar transformer and the second winding trace on the first layer forms an auxiliary winding of the planar transformer.

16. The planar transformer of claim 12, wherein the first and second winding traces have a same number of turns.

17. The planar transformer of claim 12, wherein the third layer further comprises a fifth winding trace that forms a shield winding of the planar transformer.

18. The planar transformer of claim 17, wherein the first winding trace on the first layer is electrically connected to the fourth winding trace on the third layer to form a primary winding of the planar transformer.

19. The planar transformer of claim 12, wherein the first winding trace, the second winding trace, the third winding trace, and the fourth winding trace are each wound around an opening in the multilayer circuit board.

20. The planar transformer of claim 12, wherein a winding trace of the first, second, third, and fourth winding traces has a width different from another winding trace of the first, second, third, and fourth traces.

\* \* \* \* \*